US011091006B1

(12) United States Patent
Rutherford

(10) Patent No.: US 11,091,006 B1
(45) Date of Patent: Aug. 17, 2021

(54) OVERHEAD AUTOMATIC HEATING, VENTILATION, AND AIR CONDITIONING (HVAC) APPARATUS

(71) Applicant: Lawrence Rutherford, Dallas, TX (US)

(72) Inventor: Lawrence Rutherford, Dallas, TX (US)

( * ) Notice: Subject to any disclaimer, the term of this patent is extended or adjusted under 35 U.S.C. 154(b) by 0 days.

(21) Appl. No.: 16/743,642

(22) Filed: Jan. 15, 2020

Related U.S. Application Data

(63) Continuation-in-part of application No. 15/801,345, filed on Nov. 2, 2017, now Pat. No. 10,569,618.

(51) Int. Cl.
| | | |
|---|---|---|
| *B60H 1/00* | (2006.01) | |
| *B60H 1/24* | (2006.01) | |
| *H02S 40/38* | (2014.01) | |
| *B60H 1/26* | (2006.01) | |

(52) U.S. Cl.
CPC ....... *B60H 1/00428* (2013.01); *B60H 1/0055* (2013.01); *B60H 1/00414* (2013.01); *B60H 1/00535* (2013.01); *B60H 1/245* (2013.01); *B60H 1/262* (2013.01); *H02S 40/38* (2014.12)

(58) Field of Classification Search
CPC .......... B60H 1/00; B60H 1/245; B60H 1/262; B60H 1/008; B60H 1/00828; B60H 1/00978
USPC ... 454/136–138, 141, 143, 156, 69, 84, 129, 454/159–160
See application file for complete search history.

(56) References Cited

U.S. PATENT DOCUMENTS

| | | | | | |
|---|---|---|---|---|---|
| 2,532,268 | A | * | 11/1950 | Christmann | F24F 1/02 62/259.1 |
| 7,032,399 | B2 | * | 4/2006 | Czechowicz | B60H 1/00535 224/326 |
| 2018/0208016 | A1 | * | 7/2018 | O'Brien | B60H 1/245 |

OTHER PUBLICATIONS

Nasri, M. Weckerle, C. "A/C-APU-Innovative Air Conditioning Unit Based on Hydrogen to Extend the Driving Range of EV's and FCEVs". EVS30 Symposium. Stuttgart, Germany. Oct. 9-11, 2017.*

* cited by examiner

*Primary Examiner* — Vivek K Shirsat
(74) *Attorney, Agent, or Firm* — Gibraltar Consulting LLC; Tariq S. Najee-ullah

(57) ABSTRACT

An overhead automatic Heating, Ventilation, and Air Conditioning (HVAC) apparatus can be installed in an overhead surface within various types of vehicles, structures, and buildings, in order to maintain comfortable temperature inside of the respective environment. The overhead automatic HVAC apparatus can be installed in the roof of an automobile, allowing the driver to return to a comfortable temperature. Also this provides safety, preventing a child left inside of the automobile from being harmed due to extreme temperatures. The overhead automatic HVAC apparatus can be installed in a roof of a military vehicle, such as an High Mobility Multipurpose Wheeled Vehicle (HMMWV), or the ceiling of an office inside of a commercial building. The overhead automatic HVAC apparatus can be self-powered, including a battery and a solar-powered generator which allows the overhead automatic HVAC apparatus to run when conventional AC units are off, reduces costs, and power consumption.

19 Claims, 7 Drawing Sheets

OVERHEAD AUTOMATIC HEATING, VENTILATION, AND AIR CONDITIONING (HVAC) APPARATUS

RELATED APPLICATIONS

This application is a continuation-in-part of U.S. patent application Ser. No. 15/801,345, filed on Nov. 2, 2017, the contents of which is incorporated herein by reference in its entirety.

FIELD OF DISCLOSURE

The present disclosure generally relates to Heating, Ventilation, and Air Conditioning (HVAC) units, and more particularly, to an automatic HVAC apparatus that can be used in various environments where temperature control may be desired, such as cars, trucks, boats, houses, corporate buildings, and the like.

BACKGROUND OF THE DISCLOSURE

Various types of HVAC units are known in the prior art. Generally, HVAC systems can be installed in structural buildings having indoor areas that need environmental regulation to improve comfort, such as homes, offices, restaurants, and hospitals. HVAC systems can also be used in transportation, for instance integrating HVAC units with motor vehicles. In the case of motor vehicles, many existing HVAC units are large, roof mounted units designed primarily for vans and campers. They are unsightly, and would look even more so on a normal passenger car. Air conditioning is often the primary function, and the units are intended for use while the vehicle is occupied, not unattended. Therefore, it may be desirable to provide a more streamlined HVAC system (or device) that is designed for improved energy efficiency and space efficiency. This need and other needs are satisfied by the various aspects of the present disclosure.

BRIEF OVERVIEW

The general purpose of the present overhead automatic HVAC apparatus, described subsequently in greater detail, is to provide an automatic HVAC apparatus that has many novel features that result an automatic HVAC apparatus that is not anticipated, rendered obvious, suggested, or even implied by prior art, either alone or in combination thereof. In one or more aspects, the general purpose of the present overhead automatic HVAC apparatus is to provide an apparatus that can be integrated into the roof of a normal vehicle (e.g., standard sized car, sports utility vehicle, or truck) to maintain the temperature inside the vehicle at a comfortable and safe level when left unattended, especially when a pet or child is left inside.

Moreover, the overhead automatic HVAC apparatus may be a streamlined HVAC system which can be used in a myriad of environments in addition to cars, such as other types of motorized vehicles (e.g., boats, trucks), houses, and buildings (e.g., churches, offices, hospitals), as a supplement to and/or replacement for traditional HVAC systems. For example, a traditional HVAC system installed in an office building can be replaced by a streamlined HVAC apparatus to still provide heating and cooling throughout the building, while using a unit that is designed for improved energy efficiency and space efficiency.

To accomplish this, the present overhead automatic HVAC apparatus includes a rectangular unit body that can be disposed on an interior surface of a structure, such as a building or vehicle. The HVAC apparatus can be installed on an interior surface that is generally located in an upper area (also referred to as overhead) of the structure, which allows the HVAC apparatus to control the temperature in the surrounding area below (e.g., space within the structure). As examples, the overhead automatic HVAC apparatus can be installed in the roof of a car, or installed in the ceiling of an office.

In an embodiment the overhead automatic HVAC apparatus can be installed in various types of vehicles, including, but not limited to: motor vehicles (e.g., motorcycles, cars, trucks, buses); railed vehicles (e.g., trains, trams, trolleys); watercraft (e.g., ships, boats, ferryboats); and aircraft (e.g., airplanes, helicopters). According to this embodiment, the unit body of the overhead automatic HVAC apparatus can be configured to occupy the entirety of a vehicle's roof (with the exception of a sunroof, grates, or other openings in roof of the vehicle, if present). The unit body can have a thickness equal to a second thickness of the vehicle's roof, and thus does not interfere with the aesthetic of an exterior of the vehicle, for example a car exterior.

In another embodiment, the overhead automatic HVAC apparatus can be installed in various types of buildings and/or structures, including, but not limited to: houses; elevators; storage units; warehouses; office buildings; hospitals; retail spaces; hotels; churches; and the like. According to this embodiment, the HVAC apparatus can be configured for easy installation into an interior surface of the structure, such as a ceiling of an office. The overhead automatic HVAC apparatus can have a streamlined design being structured with substantially small dimensions and smaller physical size (as compared to the building or structure, itself). For instance, the unit body of the overhead automatic HVAC apparatus is configured to occupy a small portion of the structure's ceiling or upper area (which allows for a plurality of overhead automatic HVAC apparatuses to be installed to cover the entire area of the ceiling).

The overhead automatic HVAC apparatus includes a plurality of vents is disposed within the unit body. In one embodiment of the invention, the plurality of vents has a first open position and a second closed position. When the plurality of vents is in the second closed position, the contour of the vents match the shape of the interior surface where it is disposed. For example, if the vents are arranged in the closed position, the overhead automatic HVAC apparatus has a predominantly linear silhouette (horizontally flat surface) that is aligned with the roof of the car. A light is centrally disposed on the plurality of vents. A plurality of fans is disposed within the vents, wherein each of the plurality of fans has a perimeter. A heater disposed within the unit body has a heater coil disposed on the perimeter of each of the plurality of fans, allowing the fans to blow hot air into the structure's interior space to keep it warm. When the external temperature is hot, the heater remains off and the fans circulate air into the vehicle, building, or structure. Also, a container can be disposed within the unit body for storing a coolant, such as hydrogen. Thus, the container acts as an additional cooling source for the overhead automatic HVAC apparatus.

A central processing unit (CPU) can be disposed within the unit body. Other types of processing devices, such as circuit boards, electronics controllers, microcontrollers, and the like, can be implemented in the unit body as an alternative to a CPU. For the purposes of the disclosure, any of the CPUs mentioned hereinafter may be embodied as one CPU, the same CPU, used interchangeably, or be separate and independent CPUs. Regarding other electronic components mentioned herein, any of the components may be embodied as one component part, within the same component part, used interchangeably amongst one or another interchangeable parts, or be separate and independent components.

A rechargeable battery can be disposed within a side of the overhead automatic HVAC apparatus' unit body. The battery can be in operational communication with the first CPU, the heater, the light, the plurality of vents, and the plurality of fans. An alternate power source is disposed within the unit body, wherein the alternate power source is in operational communication with each of the rechargeable battery, the first CPU, the heater, the light, the plurality of vents, and the plurality of fans.

The alternate power source is configured to provide power to the first CPU, the heater, the light, the plurality of vents, and the plurality of fans when the rechargeable battery is depleted. The alternate power source can be, but is not limited to, a solar powered generator, an electronic vehicle (EV), wind energy generator, hydroelectric generator, thermal electric generator, and renewable energy generator. By having the capability to run from its own power source, use of the overhead automatic HVAC apparatus can reduce the power consumption from using traditional HVAC systems, which ultimately reduces overall electricity costs related to this consumption.

A receiver chip is also disposed within the unit body, wherein the receiver chip is in operational communication with the first CPU. A remote control having a battery, a second CPU, a first transmitter, and a plurality of control buttons can be used to operate overhead automatic HVAC apparatus. In the case of a car, the car's interface unit has a timer, a third CPU, and a second transmitter, wherein each of the timer and the second transmitter is in operational communication with the third CPU. The third CPU is in operational communication with an ignition switch of the car. The car's interface unit can detect when the vehicle has been turned off for a programmed amount of time to automatically begin ventilation or heating. In some embodiments, relays can be included in the overhead automatic HVAC apparatus. These relays allow a status of the vehicle to be communicated to the apparatus. A status indicating that the vehicle is shut-off can be automatically transmitted to the overhead automatic HVAC apparatus vis-à-vis the relays. Beyond maintaining a more comfortable temperature inside of structure for its occupants and/or items placed therein, the overhead automatic HVAC apparatus acts as a safety mechanism. The overhead automatic HVAC apparatus can prevent a child, pet, or items inside of a structure (e.g., elevator) or vehicle from being injured, dying or being damaged by excessive heat or cold.

Thus have been broadly outlined the more important features of the present car roof automatic HVAC apparatus so that the detailed description thereof that follows may be better understood and in order that the present contribution to the art may be better appreciated.

Both the foregoing brief overview and the following detailed description provide examples and are explanatory only. Accordingly, the foregoing brief overview and the following detailed description should not be considered to be restrictive. Further, features or variations may be provided in addition to those set forth herein. For example, embodiments may be directed to various feature combinations and sub-combinations described in the detailed description.

Additional aspects of the disclosure will be set forth in part in the description which follows, and in part will be obvious from the description, or can be learned by practice of the disclosure. The advantages of the disclosure will be realized and attained by means of the elements and combinations particularly pointed out in the appended claims. It is to be understood that both the foregoing general description and the following detailed description are and explanatory only and are not restrictive of the disclosure, as claimed.

BRIEF DESCRIPTION OF THE DRAWINGS

The accompanying drawings, which are incorporated in and constitute a part of this disclosure, illustrate various embodiments of the present disclosure. The drawings contain representations of various trademarks and copyrights owned by the Applicants. In addition, the drawings may contain other marks owned by third parties and are being used for illustrative purposes only. All rights to various trademarks and copyrights represented herein, except those belonging to their respective owners, are vested in and the property of the Applicants. The Applicants retain and reserve all rights in their trademarks and copyrights included herein, and grant permission to reproduce the material only in connection with reproduction of the granted patent and for no other purpose.

Furthermore, the drawings may contain text or captions that may explain certain embodiments of the present disclosure. This text is included for illustrative, non-limiting, explanatory purposes of certain embodiments detailed in the present disclosure.

DETAILED DESCRIPTION OF THE DISCLOSURE

Figure 1:
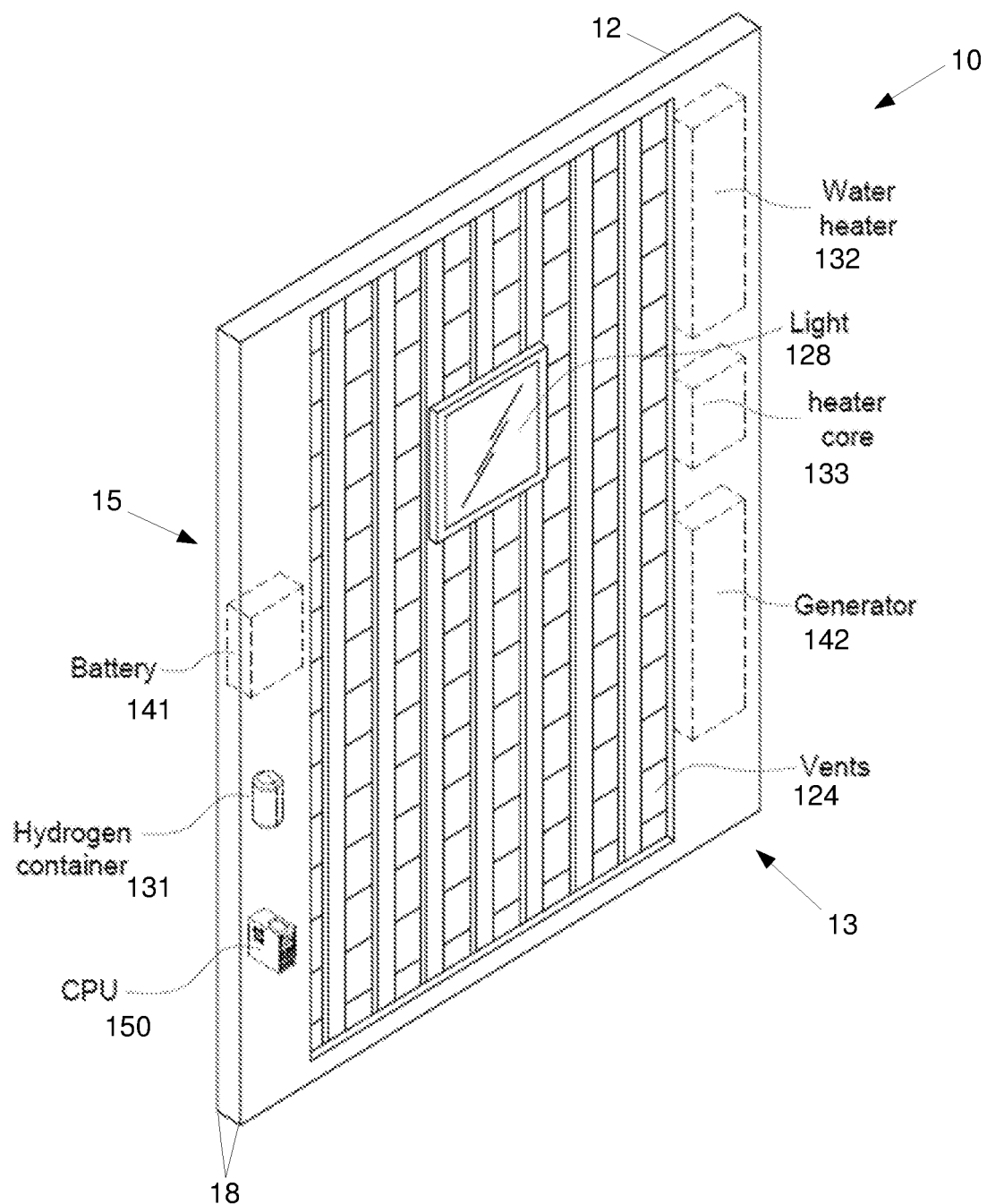
FIG. 1 is an isometric view of an overhead automatic HVAC apparatus, in accordance with an embodiment of the present disclosure.

The present disclosure includes many aspects and features. Moreover, while many aspects and features relate to, and are described in, the context of portable beauty tool assembly for cosmetics, embodiments of the present disclosure are not limited to use only in this context. The present disclosure can be understood more readily by reference to the following detailed description of the disclosure and the Examples included therein.

Before the present articles, systems, apparatuses, and/or methods are disclosed and described, it is to be understood that they are not limited to specific manufacturing methods unless otherwise specified, or to particular materials unless otherwise specified, as such can, of course, vary. It is also to be understood that the terminology used herein is for the purpose of describing particular aspects only and is not intended to be limiting. Although any methods and materials similar or equivalent to those described herein can be used in the practice or testing of the present disclosure, example methods and materials are now described.

A. Definitions

It is also to be understood that the terminology used herein is for the purpose of describing particular aspects only and is not intended to be limiting. As used in the specification and in the claims, the term "comprising" can include the aspects "consisting of" and "consisting essentially of." Unless defined otherwise, all technical and scientific terms used herein have the same meaning as commonly understood by one of ordinary skill in the art to which this disclosure belongs. In this specification and in the claims which follow, reference will be made to a number of terms which shall be defined herein.

As used in the specification and the appended claims, the singular forms "a," "an" and "the" include plural referents unless the context clearly dictates otherwise. Thus, for example, reference to "an opening" can include two or more openings.

Ranges can be expressed herein as from one particular value, and/or to another particular value. When such a range is expressed, another aspect includes from the one particular value and/or to the other particular value. Similarly, when values are expressed as approximations, by use of the antecedent 'about,' it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units are also disclosed. For example, if 10 and 15 are disclosed, then 11, 12, 13, and 14 are also disclosed.

As used herein, the terms "about" and "at or about" mean that the amount or value in question can be the value designated some other value approximately or about the same. It is generally understood, as used herein, that it is the nominal value indicated ±10% variation unless otherwise indicated or inferred. The term is intended to convey that similar values promote equivalent results or effects recited in the claims. That is, it is understood that amounts, sizes, formulations, parameters, and other quantities and characteristics are not and need not be exact, but can be approximate and/or larger or smaller, as desired, reflecting tolerances, conversion factors, rounding off, measurement error and the like, and other factors known to those of skill in the art. In general, an amount, size, formulation, parameter or other quantity or characteristic is "about" or "approximate" whether or not expressly stated to be such. It is understood that where "about" is used before a quantitative value, the parameter also includes the specific quantitative value itself, unless specifically stated otherwise.

The terms "first," "second," "first part," "second part," and the like, where used herein, do not denote any order, quantity, or importance, and are used to distinguish one element from another, unless specifically stated otherwise.

As used herein, the terms "optional" or "optionally" means that the subsequently described event or circumstance can or cannot occur, and that the description includes instances where said event or circumstance occurs and instances where it does not. For example, the phrase "optionally affixed to the surface" means that it can or cannot be fixed to a surface.

Moreover, it is to be understood that unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of aspects described in the specification.

Disclosed are the components to be used to manufacture the disclosed apparatuses, systems, and articles of the disclosure as well as the apparatuses themselves to be used within the methods disclosed herein. These and other materials are disclosed herein, and it is understood that when combinations, subsets, interactions, groups, etc. of these materials are disclosed that while specific reference of each various individual and collective combinations and permutation of these materials cannot be explicitly disclosed, each is specifically contemplated and described herein. For example, if a particular material is disclosed and discussed and a number of modifications that can be made to the materials are discussed, specifically contemplated is each and every combination and permutation of the material and the modifications that are possible unless specifically indicated to the contrary. Thus, if a class of materials A, B, and C are disclosed as well as a class of materials D, E, and F and an example of a combination material, A-D is disclosed, then even if each is not individually recited each is individually and collectively contemplated meaning combinations, A-E, A-F, B-D, B-E, B-F, C-D, C-E, and C-F are considered disclosed. Likewise, any subset or combination of these is also disclosed. Thus, for example, the sub-group of A-E, B-F, and C-E would be considered disclosed. This concept applies to all aspects of this application including, but not limited to, steps in methods of making and using the articles and apparatuses of the disclosure. Thus, if there are a variety of additional steps that can be performed it is understood that each of these additional steps can be performed with any specific aspect or combination of aspects of the methods of the disclosure.

It is understood that the apparatuses and systems disclosed herein have certain functions. Disclosed herein are certain structural requirements for performing the disclosed functions, and it is understood that there are a variety of structures that can perform the same function that are related to the disclosed structures, and that these structures will typically achieve the same result.

Consistent with embodiments of the present disclosure, a portable beauty tool assembly may be provided. This overview is provided to introduce a selection of concepts in a simplified form that are further described below. This overview is not intended to identify key features or essential features of the claimed subject matter. Nor is this overview intended to be used to limit the claimed subject matter's scope. The mirror and assembly may be used by individuals or companies to utilize a collapsible, hands free, cosmetics mirror in a hanging, standing, wearable, or collapsed position of operation.

With reference now to the drawings, and in particular FIG. 1 through FIG. 7 thereof, examples of the overhead automatic HVAC apparatus employing the principles and concepts of the apparatus will be described.

Referring now to FIG. 1, a perspective view of the overhead automatic HVAC apparatus 10 is shown, including various internal components that may be comprise by the apparatus 10. The overhead automatic HVAC apparatus 10 includes a unit body 10, which serves as a housing for securing the internal electrical (e.g., power, computer processing, etc.), and HVAC elements inside of the apparatus 10. The unit body can described as having a generally rectangular shape (or rectilinear) in FIG. 1. For instance, as seen in FIG. 1, the unit body 12 of the overhead automatic HVAC apparatus 10 has four rectilinear sides that form the perimeter (or edges) of the apparatus 10. The unit body 12 can be comprised of a sturdy material, such a light metal or steel. In some cases, the unit body 12 is constructed from the same materials used for the installation environments, such as steel for installation in most cars, and a lightweight and rust-resistant aluminum for installation in a military vehicle.

The unit body 12 can also be described as being divided into a first side 13 (left) and a second side 15 (right), for instance being two opposite sides of the apparatus 10 with respect to a center axis. In some embodiments, for example when the overhead automatic HVAC apparatus 10 is installed in a vehicle, the apparatus 10 can be specifically arranged such that the first side 13 is placed on the driver side of the vehicle, and the second side 15 is placed on the passenger side of the vehicle. Other arrangements for the apparatus 10, as pertaining to different installation environments, will be described in detail below. Although the unit body 12 is described as being generally rectangular for purposes of discussion, it should be appreciated that the unit body 12 can be structured in various different shapes as deemed most appropriate for the its practical application.

FIG. 1 also shows various internal components of the overhead automatic HVAC apparatus 10. In the illustrated example, the apparatus 10 includes: water heater 132; light 128; heater core 133; generator 142; plurality of vents 124; computing processing unit (CPU) 150; hydrogen container 131; and battery 141. In use, these components work in concert to implement the various cooling, heating, power, and communication functions of the apparatus 10, as further disclosed herein. By including all of the various components inside of the unit body 12, the overhead automatic HVAC apparatus 10 may be easily installed as a monolithic unit inside of an automobile, building, or other structure, as disclosed herein. Alternatively, one or more of the above-mentioned components can be implemented separately from the For example, a hydrogen container 131 can being installed independently as a supplemental and/or accessory components that is then connected to the apparatus 10 after installation.

As a general description, the battery 141 and generator 142 are devices used to provide power to the overhead automatic HVAC apparatus 10 and the internal elements disposed therein. In some embodiments, the battery 141 can be a rechargeable battery. Additionally, in some embodiments, the generator 142 is an alternate power source, such as a solar power source, which can be used in place of (or supplemental to) the battery 141 (e.g., battery depleted or malfunctioned). According to this solar powered embodiment, the generator 142 is implemented using mechanisms that are capable of converting solar energy from sunlight into electricity, for example using photovoltaics (PV), indirectly using concentrated solar power, or a combination thereof. A solar powered generator 142 can use a plurality of lenses (or mirrors), and tracking systems to reflect an area of sunlight emitted naturally from the sun, and focus this light into a small beam. Also, a solar powered generator 142 can include a plurality of photovoltaic cells (or solar panels) that can convert light into electrical current using the photovoltaics effect. Thus, by being specifically designed to include its own power sources, such as battery 141 and generator 142, the apparatus 10 is essentially completely self-powered. In other words, the apparatus 10 can fully operate without pulling electricity from a power of the surrounding installation environment. For example, when the apparatus 10 is installed in a vehicle (as shown in FIG. 3), the apparatus 10 can function without using the vehicle's dedicated battery, and can continue to operate even when the vehicle and its electronic components are turned off.

Thus, these self-power elements and functions of the overhead automatic HVAC apparatus 10 can provide safety capabilities. The overhead automatic HVAC apparatus 10 can continue to run, providing a comfortable and safe temperature inside of the car, even when the car and its AC is off (e.g., driver is away from the vehicle, car is parked, etc.). Consequently, the overhead automatic HVAC apparatus 10 is uniquely designed for operating in conditions when many conventional HVAC systems are non-operational, thereby preventing children, pets, or items inside of a structure (e.g., elevator) or vehicle from being injured dying or being damaged by excessive heat or cold. Furthermore, by having the capability to run from its own power source, the overhead automatic HVAC apparatus 10 can reduce the amount of power consumed, which can ultimately reduce overall electricity costs for a building, for instance. In some embodiments, the apparatus can include a back-up battery compartment (not shown), which can be used to install a back-up battery therein. Additionally, in some embodiments, the solar-powered generator 142 can be used to recharge the battery 141.

Figure 5:
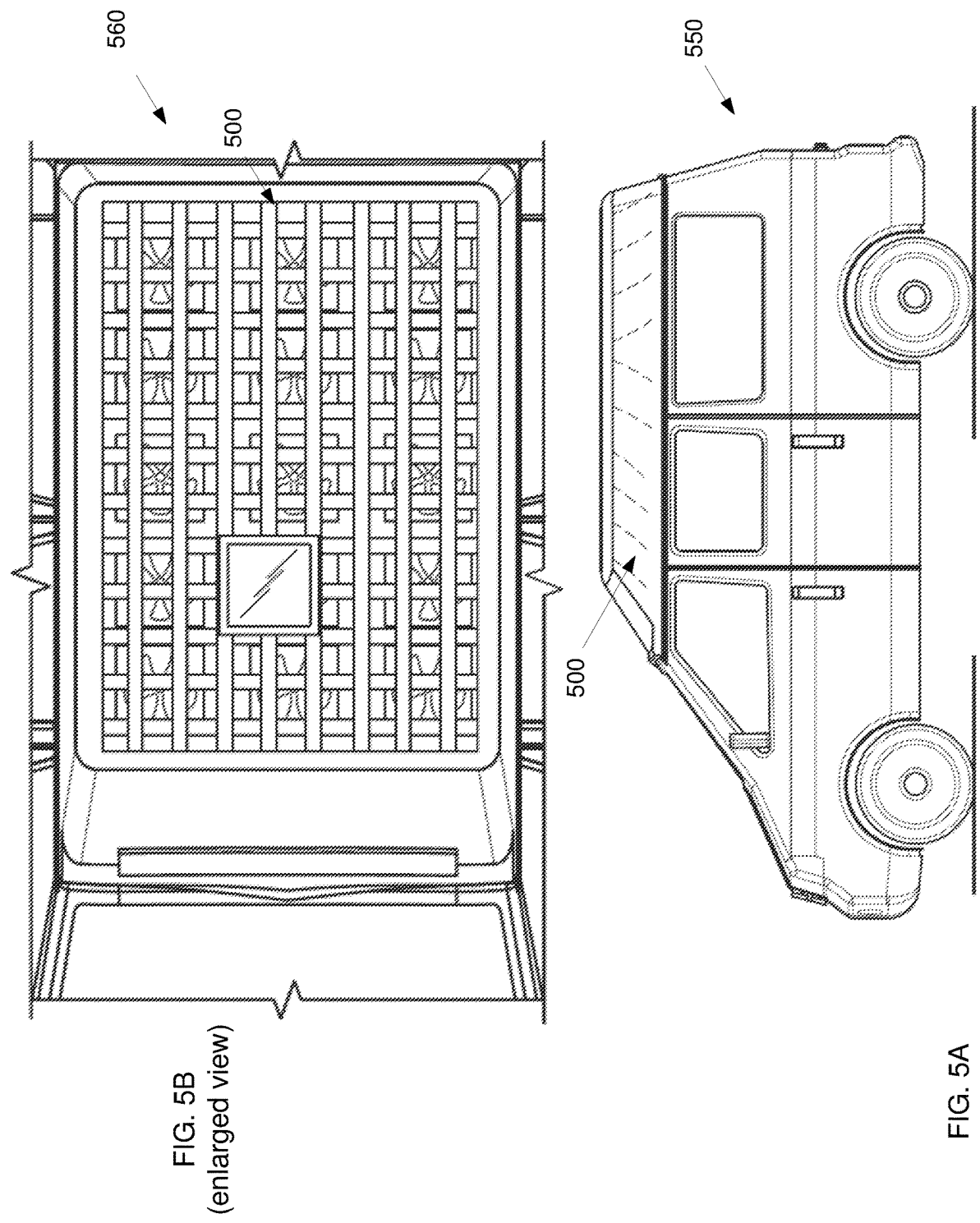
FIG. 5A is an in-use and isometric view of an example of the overhead automatic HVAC apparatus installed in a high occupancy vehicle, in accordance with an embodiment of the present disclosure.
FIG. 5B is a bottom view of the overhead automatic HVAC apparatus installed in the interior roof of the high occupancy vehicle shown in FIG. 5A, in accordance with an embodiment of the present disclosure.
Figure 6:
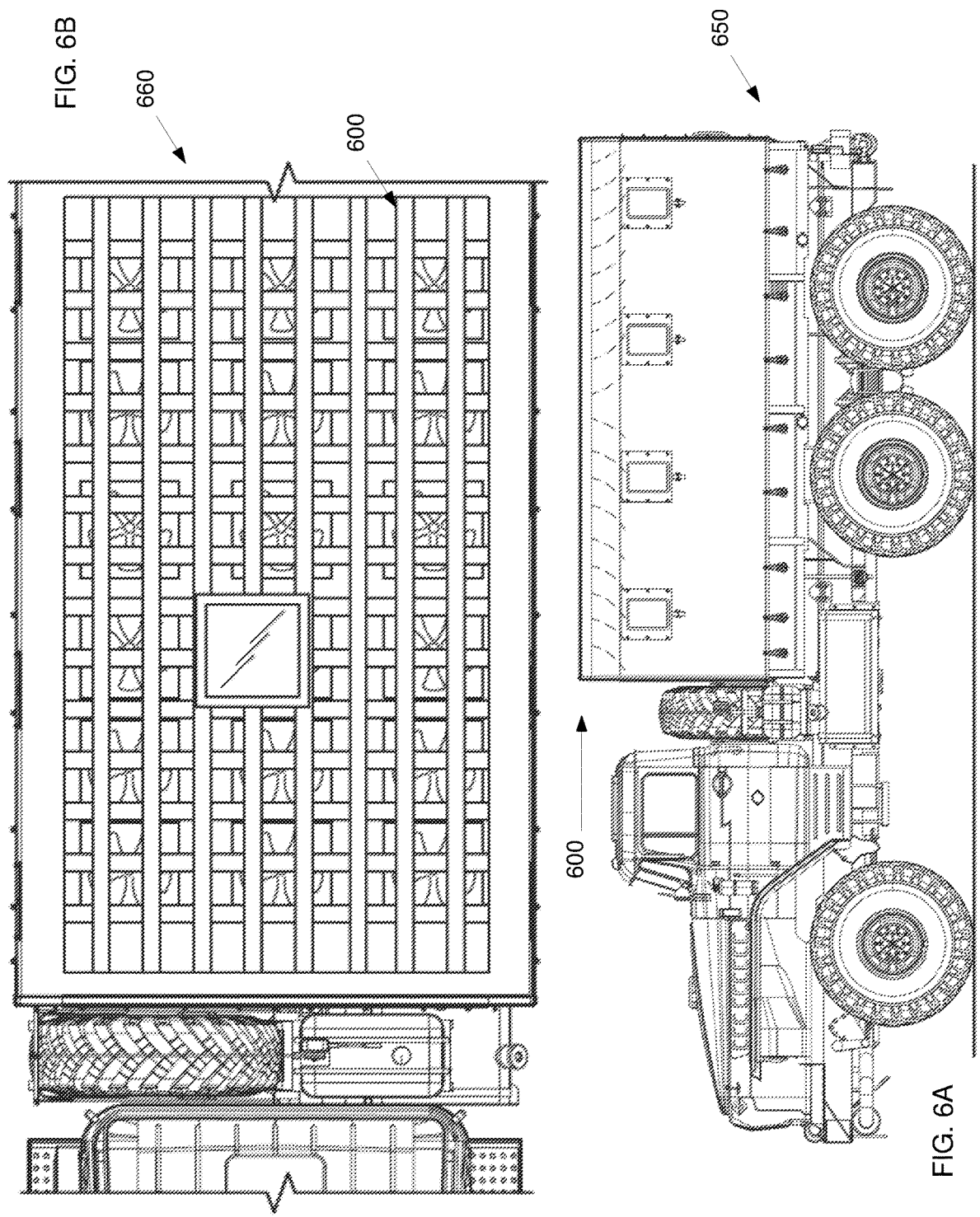
FIG. 6A is an in-use and isometric view of an example of the overhead automatic HVAC apparatus installed in a military grade vehicle, such as a High Mobility Multipurpose Wheeled Vehicle (HMMWV), in accordance with an embodiment of the present disclosure.
FIG. 6B is a bottom view of the overhead automatic HVAC apparatus installed in the interior roof of the military grade vehicle shown in FIG. 5A, in accordance with an embodiment of the present disclosure.

Additionally, FIG. 1 shows that that the unit body 12 can be particularly structure to defined dimensions, such as a thickness 18 (e.g., depth). The particular values that are used for the dimensions of the apparatus 10, such as thickness 18 can be determined (and altered) to accommodate different installation environments. For example, the apparatus 10 can be structured using certain dimensions to be installed in a generally smaller vehicle (e.g., sedan) as shown in FIG. 3, a larger higher occupancy vehicle (e.g., van) as shown in FIG. 5 (e.g., van), or an even larger military grade vehicle (e.g., HMMWV) shown in FIG. 6. In these embodiments, the apparatus 10 can be designed to have dimensions as deemed most appropriate for the intended installation environment, such as having a thickness 18 that is equal to a thickness of the particular vehicle's roof. Thus, the apparatus 10 can have a smaller thickness when designed for use with a sedan, versus having a larger thickness when designed for being installed in a HMMWV. Using specific dimensions, such as a defined thickness, allows for the apparatus 10 have a streamlined and compact design that does not interfere with the aesthetic of an exterior of the vehicle.

Figure 7:
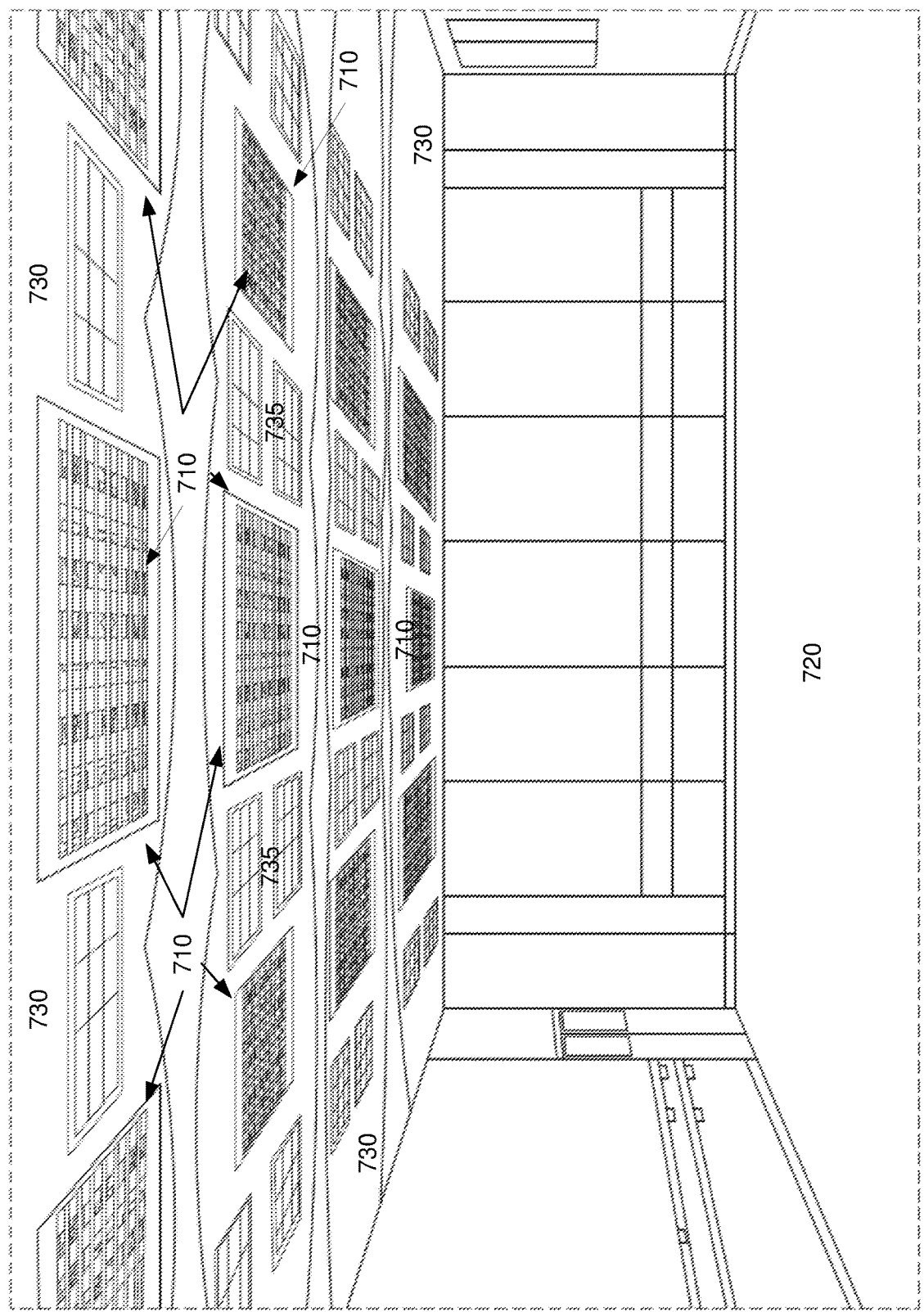
FIG. 7 is an in-use isometric view of an example of the overhead automatic HVAC apparatus installed in the roof of a commercial building, in accordance with an embodiment of the present disclosure.

In some embodiments, the apparatus 10 can be designed to have a slightly different structure (than that for use in vehicles), and use dimensions that are more appropriate for installation in large buildings, as shown in FIG. 7. Accordingly, the apparatus 10 can be designed to have dimensions that are consistent with the ceilings in the rooms of the building. Accordingly, when installed, the area of the apparatus 10 can cover the entire overhead area of in a room (e.g., equal to the area of the ceiling), and in turn covers the entire surrounding area of the room's environment underneath. Similarly, in this embodiment, the apparatus 10 can having a thickness 18 that is equal to a thickness of the particular vehicle's roof. It should be understood that the apparatus 10 can be designed to have any dimensions that are suited for stable and streamlined attachment to an intended surface during installation. As examples, the apparatus 10 can have specific dimensions that allow for installation into an overhead surface of an elevator, and different dimensions that are defined for installation into an overhead surface in a cabin of a boat. Alternatively, the apparatus 10 can have a universal structure. In a universal structure, the apparatus may not include dimensions that are particularly defined for a specific environment, rather using dimensions that are determined generally acceptable for installation into a plethora of installation environments. That is, in a universal structure, the apparatus 10 can be installed in a sedan, a HMMWV, a commercial building, and other installation environments using the same dimensions.

Also, FIG. 1 shows a plurality of vents 124 that are disposed within the unit body 12 for the overhead automatic HVAC apparatus 10. In some embodiments, the plurality of vents 124 can be arranged in a first open position, and a second closed position. Accordingly, in operation, vents 124 in the open position have sections that extends outward creating an opening in the vent 124 that allows for air (cooled or heated) to travel through and enter the environmental area below. Thus, in general, the vents 124 are open when the apparatus 10 is functioning. In the closed position, portions of the vents 124 may be retracted inward to seal the vents 124 closed and preventing air from coming through the vents 124. In some instances, the vents 124 are in the closed positioned when the apparatus is not operating, so as to allow for the silhouette of the apparatus 10 to be primarily linear and aligned with the surface where it is installed. For example, when the apparatus 10 in installed in a vehicle, and the vents are closed, the apparatus 10 can resemble the original interior roof of the vehicle.

As seen in FIG. 1, a light 128 can be included in the overhead automatic apparatus 10. Particularly in FIG. 1, the light 128 is disposed in the center of the plurality of vents 124 within the unit body 12.

As a general description, the battery water heater 132, heater core 133, and hydrogen container 131 are the devices used to implement the HVAC capabilities, such as heating and cooling, for the overhead automatic HVAC apparatus 10. The hydrogen container 131 can be a mechanism that stores hydrogen or other coolants. In this embodiment, hydrogen (e.g., liquid or gas) can be stored in the hydrogen container 131 and used as a coolant is a substance to reduce or regulate the temperature of a system or environment. As used herein, the term "coolant" is consistent with terminology understood and common in automotive and HVAC applications.

The hydrogen container 131 may be constructed using any material suitable for safely housing hydrogen in either liquid or gas form. Also, the hydrogen container 131 can range is sizes, for instance being a generally large-sized container, such as a tank, having a larger volume for housing a large amount of hydrogen (or other cooling/heating substance). In some embodiments, the hydrogen container 131 can be a small-sized container, such as a capsule, having a small volume for housing a small amount of hydrogen (or other cooling/heating substance). As alluded to above, the hydrogen container 131 can utilize technologies that exist for hydrogen storage in containers and/or materials. Storage in containers can include compressed hydrogen storage, or liquid storage approaches. In the compressed hydrogen storage approach, hydrogen may be saved in the form of gas, with high pressure. In contrast, in the liquid hydrogen storage approach, hydrogen may be saved in liquid form. On the other hand, storing hydrogen in materials can involve the use of certain materials, such as metal hydride, and sorption materials. In some embodiments, the hydrogen container 131 is configured for storing compressed hydrogen, which is commonly considered a solution for hydrogen storage in automotive systems due to the relative simplicity of gaseous hydrogen, refueling capabilities, and dormancy characteristics.

Additionally, FIG. 1 shows that the overhead automatic HVAC apparatus 10 includes a CPU 150. The CPU 150 can be generally described as hardware processor(s), processing device(s), or computing system that implements the communication and automation capabilities of the apparatus 10. The CPU 150 can be configured using customized hard-wired logic, one or more ASICs or FPGAs, firmware and/or program logic which in combination with the CPU 150 causes the apparatus 150 to perform the techniques herein. For example, instructions may be read into a main memory of the CPU 150 from another storage medium, such as a storage device. Execution of the sequences of instructions contained in a main memory of CPU 150 may causes its processors to perform the HVAC capabilities described herein. In alternative embodiments, hard-wired circuitry may be used in place of or in combination with software instructions. For instance, in the embodiment of a vehicle installation, a vehicle's interface unit may be in operational communication with the CPU 150 of the apparatus. Thus, as the vehicle's interface unit detects when the vehicle has been turned off (indicative of turning-off the vehicle's AC system), this state can be communicated to the CPU 150. As a result, the CPU 150 can automatically turn on the apparatus 10 to provide ventilation or heating, particularly in instances when the is car is off so its AC system is not operating.

Figure 2:
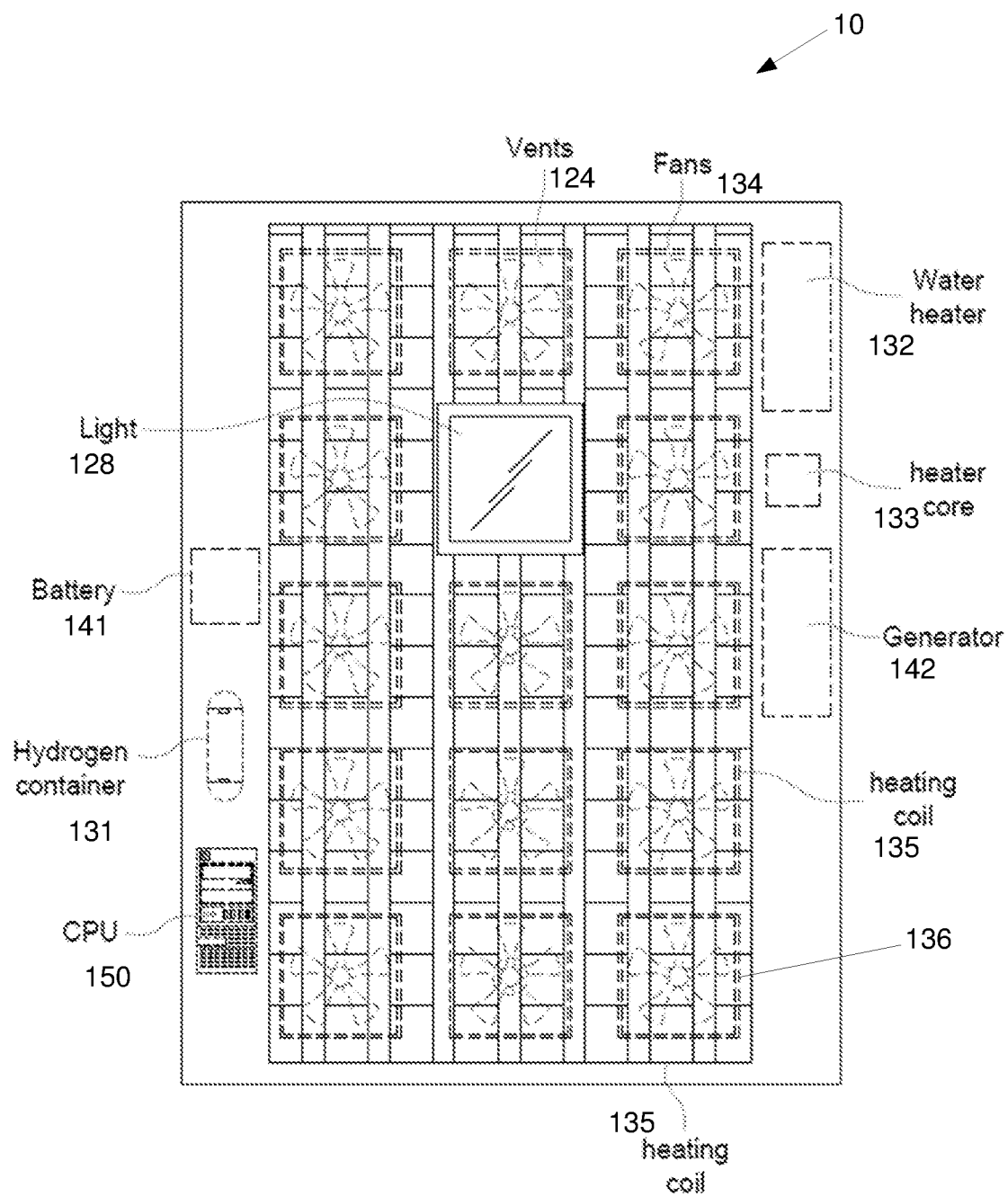
FIG. 2 is a top plane view of the overhead automatic HVAC apparatus, in accordance with an embodiment of the present disclosure.

Referring now to FIG. 2, a top plane view of the overhead automatic HVAC apparatus 10 is illustrated. FIG. 2 particularly shows that the apparatus 10 can include a plurality of fans 134. In the example configuration, each fan 134 is disposed within a corresponding vent 124. Thus, a current of air generated by the fan 134 for heating, cooling, or ventilation can radiate out of the apparatus 10 through the fan's 134 respective vent 124. Also, each of the plurality of fans 134 is shown to have a perimeter 136 (indicated by dashed lines) within its corresponding vent 124.

Also, a heating coil 136 can be disposed on the perimeter 136 of each of the plurality of fans 134. A heating coil 136 can be a spiral-shaped heating element, which converts electrical energy into heat. A heating coil 136 can be placed at an edge of each fan 134. Thus, during operation, as the heating coil 136 generates heat (converted from electrical energy) at the perimeter of its corresponding fan 134, the fan 12 can blow warmed air down through the vent 124 in order to heat, or raise the temperature, of the surrounding area.

As alluded to above, the various electro-mechanical components inside of the unit body 12 of the apparatus 10 are configured to communicate with the CPU 150, so as to be controlled and/or managed. In other words, the CPU 150 acts as the controller of the apparatus 10. For example, the battery 141, the water heater 132 (and other heating elements), the light 128, the plurality of vents 124, and the plurality of fans 134 can be communicatively connected to and/or controller by the CPU 150. Furthermore, the power sources, namely the battery 141 and the generator 142 (e.g., an alternate power source) are in operational communication with the first CPU 150, the water heater 132 (and other heating elements), the light 128, the plurality of vents, and the plurality of fans 134.

Figure 3B:
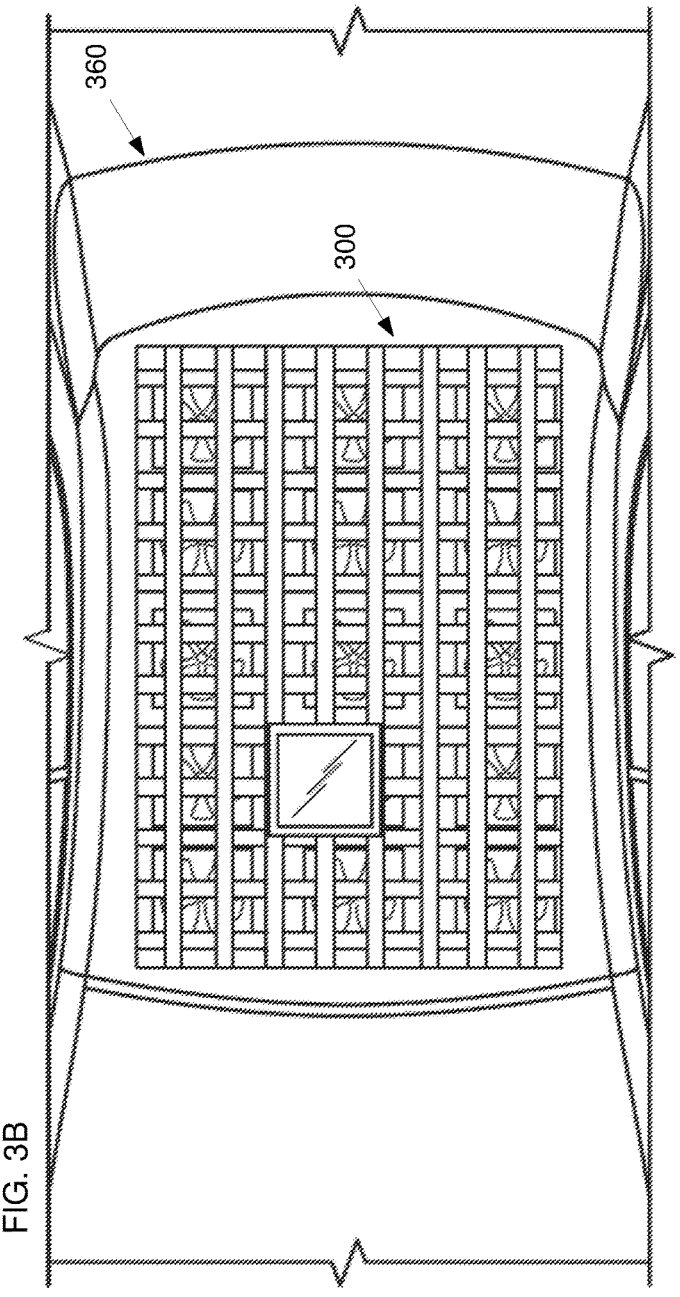
FIG. 3B. is a bottom view of the overhead automatic HVAC apparatus installed in the interior roof of the low occupancy vehicle shown in FIG. 3A, in in accordance with an embodiment of the present disclosure.
Figure 3A:
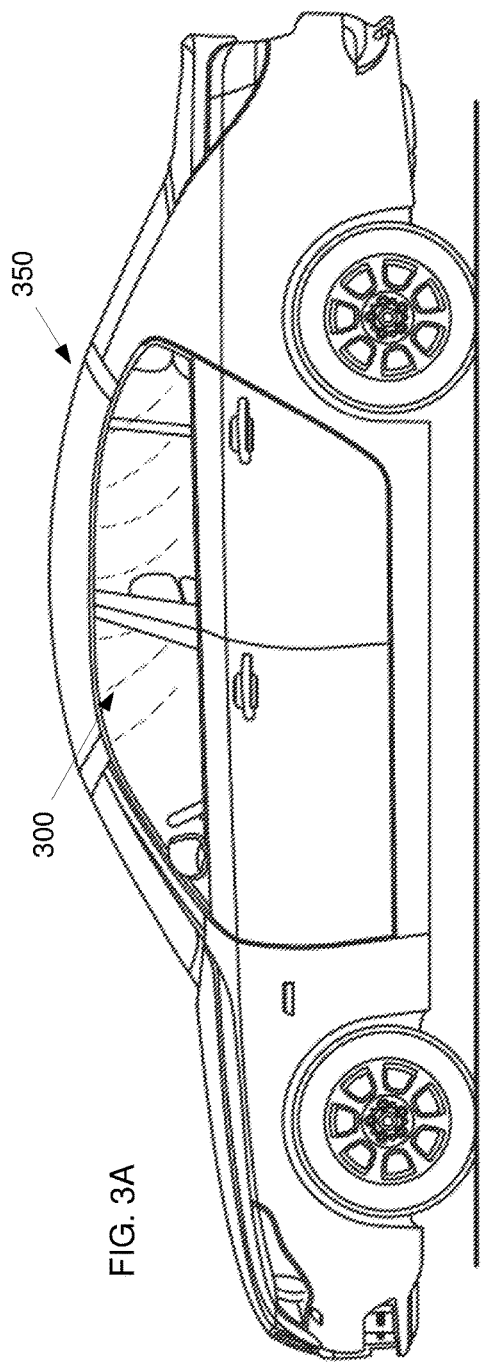
FIG. 3A is an in-use side elevation view of an example of the overhead automatic HVAC apparatus installed in a low occupancy vehicle, in accordance with an embodiment of the present disclosure.

In FIG. 3A, an example of the overhead automatic HVAC apparatus 300 installed in a vehicle 350, or automobile, that is generally used for lower occupancy (e.g., four occupants) is shown. In the example of FIG. 3A, the vehicle 350 is particularly shown as a four-door sedan, illustrating that the apparatus 300 can be used by conventional vehicles that are most commonly on the roads and highways. However, it should be appreciated that the overhead automatic HVAC apparatus 300 disclosed herein may be implemented with any of a number of different vehicles and vehicle types. For example, overhead automatic HVAC apparatus 300, as disclosed herein, may be used with automobiles, trucks, recreational vehicles and other like on- or off-road vehicles. In addition, apparatus 300 disclosed herein may also extend to other vehicle types as well, such as hybrid electric vehicle (HEV), autonomous vehicles, and the like. Furthermore, the HVAC apparatus 300, as disclosed herein can be used by gasoline- or diesel-powered vehicles, fuel-cell vehicles, electric vehicles, or other vehicles.

FIG. 3A illustrates that the overhead automatic HVAC apparatus 300 can be installed in the interior roof of the vehicle 350. This arrangement is prominently shown in FIG. 3B. Referring now to FIG. 3B, the HVAC apparatus 300 can be attached to an interior surface of the vehicle's roof 360. The apparatus 360 may be securely and stably affixed to the roof 360 of the vehicle as a single unit, using various attaching mechanisms, such as screws, fasteners and the like. Accordingly, all of the internal components that are housed within the apparatus 360 can be powered and controlled independently of the vehicle. In other words, when the vehicle is off (e.g., vehicle engine, computer, and battery are turned off), the self-powered apparatus 300 can automatically turn-on to begin its HVAC functions. For example, the battery of the apparatus can power-on the plurality of heating coils 135 and fans 134 (e.g., power-on motors of the fans) to generate warm air that is pushed though the plurality of vents, which further directs the air downward from the roof 360.

Referring back to FIG. 3A, the apparatus' overhead aspects are particularly illustrated in this example. That is, FIG. 3A shows that installing the apparatus 300 in the roof of vehicle 350 arranges the apparatus 300 generally overhead, or directly above the seats for passengers inside of the vehicle 350. This configuration for the apparatus 300 is different than many commonly used car AC units. Often times, car AC units have vents that are generally placed at lower areas (e.g., dashboard) inside of the vehicle. However, the overhead automatic HVAC apparatus 300 is distinctly configured to allow the heating, cooling, or ventilating air produced by the apparatus 300 to be directed downwards inside of the vehicle's cabin, thereby controlling its internal temperature from overhead. This overhead arrangement of the apparatus 300 may be provide a more comfortable means for temperature control over convention AC units that may blow extremely hot (or cold) air at eye-level of a driver, for instance. FIG. 3A also shows the streamlined design of the apparatus 300. As seen in FIG. 3A, the apparatus 300 conforms to the contour of the vehicle's roof. In detail, when the vents of the apparatus 300 are placed in the closed position, there is no substantial portion of the apparatus 300 that awkwardly extends down from the vehicle's roof and taking away from the aesthetic of the car's interior. Moreover, although not show, the solar-powered generated of the apparatus 300 can be installed in the interior of the vehicle 350, for instance on the windshield, in a mirror, or as a part of the roof 360.

Referring now to FIG. 5A, an example of the overhead automatic HVAC apparatus 500 installed inside of another type of vehicle 550 is shown. Particularly, in FIG. 5A, the vehicle 550 is shown as an automobile that is designed for a higher number of occupants (as compared to the vehicle in FIG. 3A), such as a van. AS an example, vehicle 550 can be a van that accommodates eight passengers, and generally having larger dimensions that a typical sedan (or coupe). This illustrating that the apparatus 500 can be used by other types of vehicles that are most commonly driven on the roads and highways. The apparatus 500 installed in vehicle 550 has substantially similar configuration, components, and operation to the abovementioned apparatus described in detail in FIG. 3A. Accordingly, similar details are not specifically discussed in reference to FIG. 5A and FIG. 5B for purposes of brevity. However, as alluded to above, the apparatus 500 may be specifically designed for installation into the larger vehicle 550, having dimensions that are determined to be most suitable for the dimension of the larger vehicle 550, such as a van, SUV, or station wagon.

FIG. 5B more prominently displays the overhead automatic HVAC apparatus 500 installed in the interior roof 560 of the high occupancy vehicle shown in FIG. 5A.

In FIG. 6A, an example of the overhead automatic HVAC apparatus 600 installed inside of another type of vehicle 650 is shown. In FIG. 6A, the vehicle 650 is shown as an automobile that is designed for military use. The vehicle 650 illustrated in FIG. 6A is a HMMWV. A military vehicle, such as vehicle 650, differs from most vehicles that are often driven in civilian use, as military grade vehicle are designed for transportation over complicated land or terrain (as opposed to paved roads), and suited for combat vehicles, including weapons and safety features which are uniquely designed for use by military forces. Examples of military vehicles include, but is not limited to: HMMWVs; tanks; infantry fighting vehicles; armored personnel carriers; armored combat support vehicles; mine-protected vehicles; light armored vehicles; light utility vehicles; and the like. For example, a HMMWV, illustrated by vehicle 650, can include vehicle armor plates, and tires, engines, and other equipment (e.g., GPS) that are specifically designed for off-road capabilities. For instance, an HMMWV can be equipped with weapons, such as missiles, and large tires having treading for stabilized driving though snow, sand, and water. Nonetheless, the apparatus 600 can be designed for use with other specialized types of vehicles that are generally uncommon, and typically not seen on most roads and highways, such as military vehicles. The apparatus 600 installed in vehicle 650 has substantially similar configuration, components, and operation to the abovementioned apparatus described in detail in FIG. 3A. Accordingly, similar details are not specifically discussed in reference to FIG. 6A and FIG. 6B for purposes of brevity.

However, as alluded to above, the apparatus 600 may be specifically designed for installation into a military vehicle 650. For example, the apparatus 600 may have dimensions that are determined to be most suitable for many military vehicles, like a HMMWV, that are often extremely large. Further, the apparatus 600 can be designed to have additional aspects (e.g., openings, flaps, fasteners) that account for installation around armor, machinery, weapons, and the like, which are typically not used in civilian vehicles. As an example, FIG. 6A illustrates that vehicle 650, namely a HMMWV, can include a fully enclosed metal cabin that has an extended and horizontally flat roof. Additionally, in the case of a HMMWV, the body of the vehicle 650 can be constructed from lightweight and rust-resistant aluminum, instead of conventional steel. Thus, in an embodiment for installation in a military vehicle, the apparatus 600 can be particularly constructed to conform to a completely horizontally flat roof (as opposed to a slightly curved roof used in many sedans). Also, the apparatus 600 may be constructed from aluminum, in order to be the same material as the original roof of the vehicle 650.

FIG. 6B more prominently displays the overhead automatic HVAC apparatus 600 installed in the interior roof 660 of the military vehicle. Moreover, it should be appreciated that the abovementioned motor vehicles are intended to serve as examples, and the overhead automatic HVAC apparatus can be used with other types of motor vehicles, such as ambulances, trucks, buses, freight trucks, armored trucks; police vehicles; limousines, and the like. Even further, although not shown, the apparatus, as disclosed herein, can be appropriately installed for use in other types of vehicles, such as railed vehicles (e.g., trains, trams, trolleys); watercraft (e.g., ships, boats, ferryboats); and aircraft (e.g., airplanes, helicopters).

Figure 4:
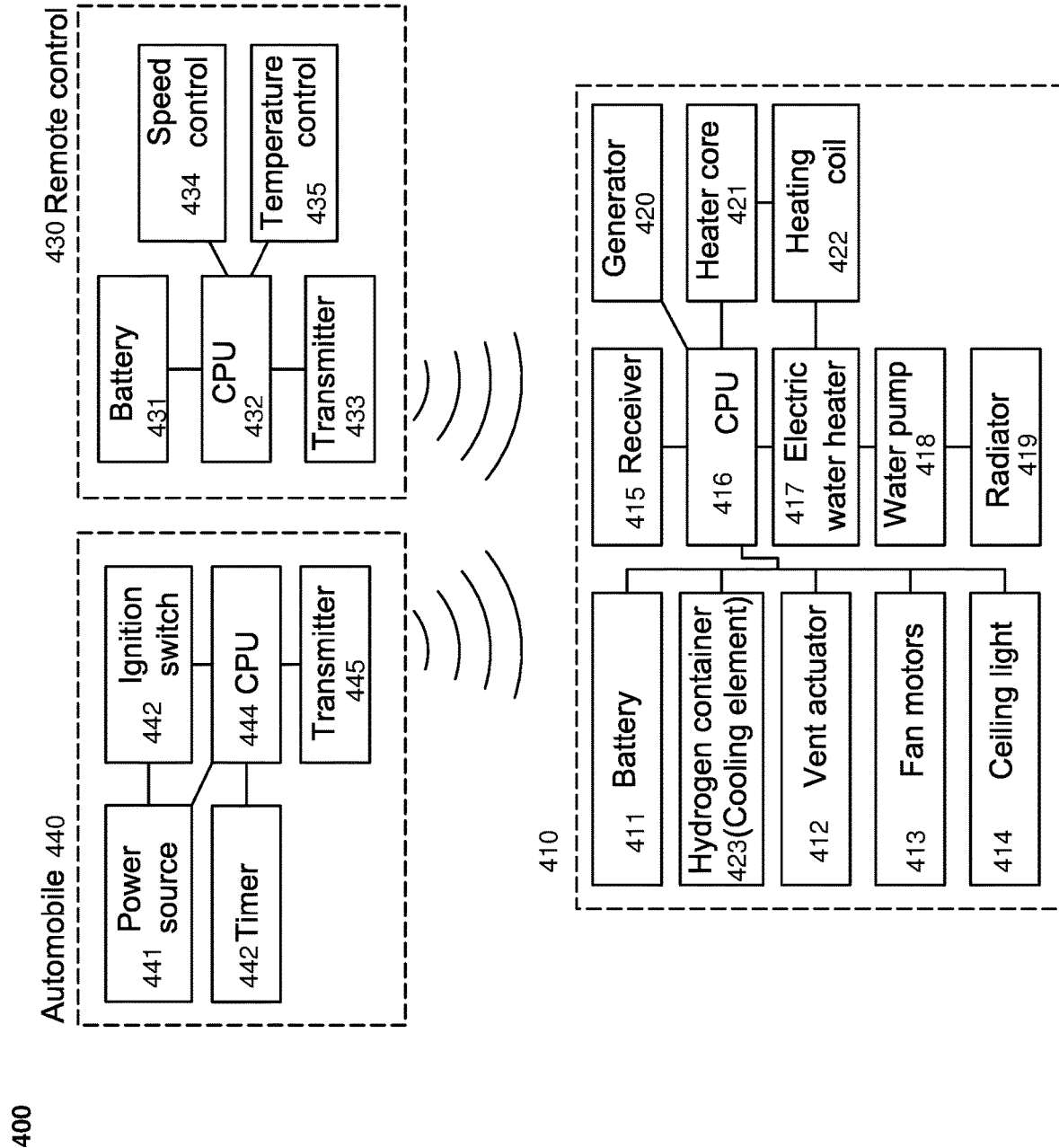
FIG. 4 is a block diagram of the overhead automatic HVAC apparatus, in accordance with an embodiment of the present disclosure.

In reference to FIG. 4, a block diagram of an example system 400 including the overhead automatic HVAC apparatus 400 in communication with a remote control 430 and an automobile 440 is depicted. FIG. 4 shows that the overhead automatic HVAC apparatus 410 can include one or more components, including: battery 411; vent actuator 412; fan motors 413; ceiling light 414; receiver 415; CPU 416; electric water heater 417; water pump 418; radiator 419; generator 420; heater core 421; heating coil 422; and hydrogen container 423. The apparatus 410 can also include a bus or other communication mechanism for communicatively coupling these aforementioned components of the apparatus 410, which allows for information to between communicated therebetween. As an example, the CPU 416 can act as a controller that initiates the cooling functions of the hydrogen container 423 and powers-on the fans to blow the cool air from the apparatus 410 produced from its cooling element.

The remote control 430 may be an electronic device that is configured to remotely control and/or operate the various functions of the overhead automatic HVAC apparatus 410. As seen, the remote control 430 can include: a battery 431; a CPU 432; a transmitter 433; a speed control 434; and a temperature control 435. For instance, the control buttons 434, 435 on the remote control can be actuated (e.g., pressed), which then causes the remote control 430 to transmit signals (vis-à-vis the transmitter 433) that are received by the receiver 415 of the apparatus 410. In response to the apparatus 410 receiving these signals, its various components can be activated and/or controlled in manner that allows the remote control 430 to operate the overhead automatic HVAC apparatus 410.

Further, FIG. 4 illustrates that the automobile 440 can include a power source 441; a timer 442; an ignition switch 442; a CPU 444; and a transmitter 445. According to the embodiments, the automobile's timer 442 and transmitter 445 are in operational communication with overhead automatic HVAC apparatus 410. The CPU 444 can be in operational communication with an ignition switch 442 of the automobile 440, as a means to be aware of when the vehicle is either turned-on or turned-off. Additionally, the CPU 444 of the automobile 440 can be programmed to detect when the automobile has been turned off for a set amount of time. Thus, once this amount of time has been reached, the CPU 444 can be programmed to automatically transmit signals (vis-à-vis transmitter 445) that power-on the overhead automatic HVAC apparatus 410.

Accordingly, FIG. 4 serves to illustrate that the overhead automatic HVAC apparatus 410, being communicatively connected to both the remote control 430 and the automobile 440 allows the apparatus 410 to be controlled and/or operated by both. For example, the overhead automatic HVAC apparatus 410 can be automatically activated by the automobile 440, or controlled remotely via the remote controller 430.

Referring now to FIG. 7, an example of the overhead automatic HVAC apparatus 710 installed in an office building is depicted. In FIG. 7, the installation environment is particularly shown as the inside of a room 720, such as an office that may be inside of a commercial office building. According to this embodiment, the overhead automatic HVAC apparatus 710 can be installed in the ceiling 730 of the room 720. For example, the overhead automatic HVAC apparatus 710 can be securely inserted into panels of the drop ceiling 730, having ceiling lights 735, and arranged such that the fans and vents of the apparatus 710 face downwards. By installing the apparatus 710 on the ceiling 730, or any other interior surface that is generally located in an upper area (also referred to as overhead) of the structure, this allows the apparatus 710 to control the temperature in the surrounding area below inside of the room 720. As an example, the cooling element (e.g., hydrogen container) within the apparatus 710 can generate cold air that is pushed down through its vents by fans. This cool air can travel down from the ceiling 730 inside of the room 720, thereby cooling (or reducing the temperature) in the room's environment. Moreover, the apparatus 710, being self-powered allows it to activate its temperature control functions when the conventional AC system of the commercial building is turned-off, for example around 6 PM to 7 AM when most occupants are no longer inside of the building. Accordingly, the apparatus 710 can automatically power itself on at specified times (e.g., when the AC is known to be off) to regulate the temperature inside of the office 720 until the building's AC system comes back on. Even further, while the apparatus 710 is on, it is running from its own power source, which alleviates additional electricity costs for the commercial building (and reduces overall electric costs associated with continuing to run the conventional AC system during off hours).

As previous described, the overhead automatic HVAC apparatus 710 can be designed to have dimensions deemed most suitable for installation in a office (or room) of a commercial building. In FIG. 7, the apparatus 710 is structured to have a primarily linear shape, consistent with the ceiling 730, and having a size that covers the entire area of the ceiling 730 (with the exception of lights). Alternatively, the apparatus 710 can be constructed to cover only a portion of the ceiling 730 (as opposed to the entire area), for instance have the same dimensions of a single panel in the ceiling 730. Although FIG. 7 shows the overhead automatic HVAC apparatus 710 being installed in a single room 720, it should be appreciated that each of the office rooms in a commercial building can similarly have a respective overhead automatic HVAC apparatus 710 installed therein. Thus, each room 720 inside of the commercial building can be individually controlled to maintain a temperature that is most comfortable to its particular occupant. Moreover, it should be understood that the abovementioned room 720 in a commercial building is intended to serve as an example, and that the overhead automatic HVAC apparatus 710 can be used with other types of building and/or structures that are not shown, such as: homes; elevators; storage units; hotels; stadiums; laundry mats; hospitals; banks; movie theaters; churches; mosques; synagogues; motels; resorts; and the like.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Insofar as the description above and the accompanying drawing disclose any additional subject matter that is not within the scope of the claims below, the disclosures are not dedicated to the public and the right to file one or more applications to claims such additional disclosures is reserved.

Although very narrow claims are presented herein, it should be recognized the scope of this disclosure is much broader than presented by the claims. It is intended that broader claims will be submitted in an application that claims the benefit of priority from this application.

The following is claimed:

1. An apparatus, comprising:
   a unit body connected to a main power source, the unit body comprising rectilinearly shaped housing having dimensions that are associated with a roof of a vehicle;
   a plurality of vents disposed within the unit body;
   a plurality of fans, wherein each of the plurality of the fans is disposed within a corresponding vent of the plurality of the vents;
   a heater disposed within the unit body and configured to generate warm air;
   a container disposed within the unit body configured to house a coolant for generating cool air;
   a battery disposed within the unit body configured to generate an electrical power for operating of the apparatus; and
   a generator disposed within the unit body configured to generate additional electrical power for operating of the apparatus;
   a central processing unit (CPU) disposed within the unit body configured to receive controls from the unit body to automatically activate generating of a cool air via the coolant or generating of a warm air via the heater in response to a loss of power to the unit body from the main power source.

2. The apparatus of claim 1, wherein the unit body is installed within the roof of the vehicle.

3. The apparatus of claim 2, wherein the plurality of fans funnel the generated cool air or the generated warm air through the plurality of vents such that the cool air or the warm air travels from the roof of the vehicle to control a temperature in a surrounding area inside of the vehicle from overhead.

4. The apparatus of claim 3, wherein the generator is solar powered, and the CPU receives electrical power from the battery or the generator such that control of the temperature in the surrounding area inside of the vehicle is activated using only the battery or the solar powered generator.

5. The apparatus of claim 1, wherein:
   an ignition of the vehicle has an on position and an off position; and
   the CPU receives controls from the vehicle to automatically perform in response to the ignition of the vehicle being turned to an off position, at least one of:
   activate a cool air generating sequence via the coolant, and
   activate a warm air generating sequence via the heater.

6. The apparatus of claim 1, wherein the coolant is hydrogen.

7. The apparatus of claim 6, wherein the container housing the coolant comprises at least one of a hydrogen tank and a hydrogen capsule.

8. The apparatus of claim 1, wherein the dimensions of the unit body are configured to occupy an area of the roof of the vehicle.

9. The apparatus of claim 8, wherein the plurality of the vents are configured to be arranged in at least one of an open position and a closed position.

10. The apparatus of claim 9, wherein the plurality of the vents are in the closed position such that a contour of the unit body conforms to a shape of the roof of the vehicle.

11. The apparatus of claim 3, wherein the apparatus further comprises:
    a light centrally disposed among the plurality of the vents.

12. The apparatus of claim 1, wherein the vehicle is a sedan type vehicle.

13. The apparatus of claim 12, wherein the dimensions of the unit body are configured to occupy an area of the roof of the sedan type vehicle.

14. The apparatus of claim 1, wherein the vehicle is a van type vehicle.

15. The apparatus of claim 14, wherein the dimensions of the unit body are configured to occupy an area of the roof of the van type vehicle.

16. The apparatus of claim 1, wherein the vehicle is a commercial vehicle comprising: a military vehicle, an ambulance, an emergency vehicle, a police car, a tractor trailer, a service vehicle, a construction vehicle, a school bus, a charter bus, a touring bus, a boat, a train car, a ferry, a trolley, a limousine, and a fire truck.

17. An apparatus, comprising:
    a unit body connected to a main power source installed in a ceiling of a room, wherein the unit body is a rectilinearly shaped housing having dimensions that are associated with the ceiling of the room;
    a plurality of vents disposed within the unit body;
    a plurality of fans, wherein each of the plurality of fans is disposed within a corresponding vent of the plurality of vents;

a heater disposed within the unit body, wherein the heater generates warm air;

a container disposed within the unit body, wherein the container houses a coolant for generating cool air;

a battery disposed within the unit body, wherein the battery generates an electrical power source for operating the apparatus;

a generator disposed within the unit body, wherein the generator generates an alternate electrical power source for operating the apparatus; and a central processing unit (CPU) disposed within the unit body, wherein the CPU automatically activates generating cool air via the coolant or generating warm air via the heater to control a temperature in a surrounding area inside of the room from overhead in response to a loss of power to the unit body from the main power source.

18. The apparatus of claim 17, wherein the dimensions of the unit body are configured to occupy an area of the ceiling of a commercial space inside of a building.

19. The apparatus of claim 17, wherein the unity body is installed in the ceiling of a space wherein the space is at least one of: a house, an elevator, a storage unit, a hotel room, a hotel, a warehouse, a hospital room, a hospital, a stadium, a stage, an office, a corporate building, a restaurant, a doctor's office, a bank, a laundry mat, a retail space, a shopping mall, a movie theatre, an entertainment venue, a church, a house of worship, a resort, and a camp site.

* * * * *